Nov. 7, 1933.        Y. SEKELLA        1,934,095

STARTING MECHANISM

Filed Jan. 29, 1931

INVENTOR
Youston Sekella
BY Clinton S. James
ATTORNEY

Patented Nov. 7, 1933

1,934,095

UNITED STATES PATENT OFFICE 1,934,095

STARTING MECHANISM

Youston Sekella, Elmira Heights, N. Y., assignor to Eclipse Machine Company, Elmira, N. Y., a corporation of New York Application January 29, 1931. Serial No. 512,012

7 Claims. (Cl. 74—7)

The present invention relates to starting mechanism and more particularly to an automatic pinion shift having yielding shifting and driving members embodying an improved form of anchoring means for said yielding members.

An object of the invention is to provide a novel anchoring means of the above type which performs its function in a reliable and efficient manner while being economical to manufacture and easy to assemble.

Another object is to provide such a device which forms a rigid interlocking connection in which a single element is utilized to prevent both longitudinal and radial motion of the yielding members with respect to the pinion.

Further objects and advantages will be apparent to those skilled in this art from the following description taken in connection with the accompanying drawing in which.

Figure 1:
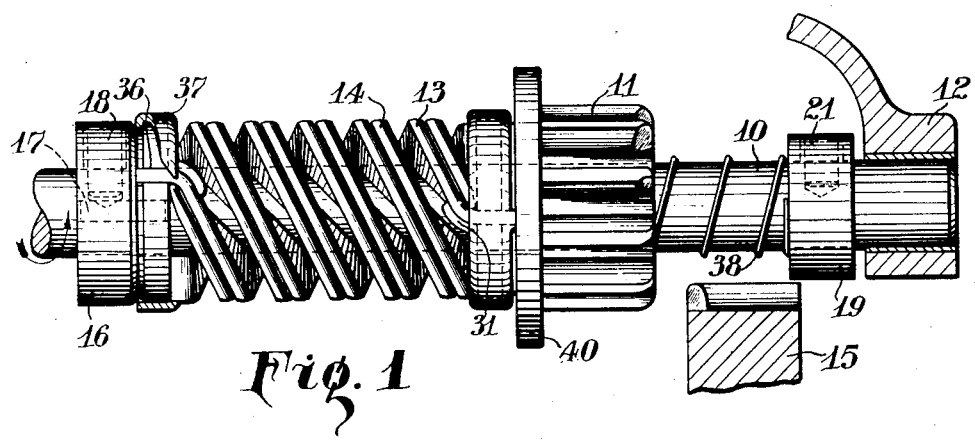
Fig. 1 is a side elevation partly broken away of a starter drive embodying a preferred form of the invention.

In Fig. 1 of the drawing, a power member in the form of a shaft 10 has mounted thereon a driving member in the form of a pinion 11 which is adapted to be moved thereon into and out of engagement with a member such as a flywheel gear 15 of an engine to be started. The shaft 10 may be the extended armature shaft of a starting motor not shown and is preferably provided with an outboard bearing such as indicated at 12.

Means are provided for the actuation of pinion 11 from shaft 10 in the form of spiral spring elements 13 and 14 anchored respectively to said pinion and to an anchoring collar 16 and having their free ends interthreaded whereby relative rotation therebetween will cause motion of the pinion 11 along the shaft 10. The collar 16 is rigidly connected to the shaft in any suitable way as by means of a key 17 and set screw 18. A thrust collar 19 is fixed on said shaft as by means of a set screw 21 in position to limit the motion of the pinion 11 in the engine engaging direction.

The means for anchoring the ends of the springs 13 and 14 according to the present invention are as follows:

The pinion 11 is provided with an extended hub portion 28 provided with substantially axial slots 23 therein. The ends 24 of springs 13 are bent to extend substantially axially thereof and are adapted to fit within said slots. Retaining means for said springs is provided in the form of a thimble 26 adapted to surround the hub 22 and close the slots 23.

The thimble is provided with a flange 27 having a central opening 28 adapted to loosely fit the shaft 10, and with radial slots 29 adapted to receive the ends of springs 13. Slots 29 are formed by bending outwardly curved arms 31, forming shoulders 32 at the base thereof. When the thimble is in assembled position, the ends 24 of the springs traverse the slots 29 and bear against shoulders 32, while the curved arms 31 bear against the outer sides of the bent portions of the springs, thereby preventing their withdrawal.

In order to secure the thimble 26 on the hub 22 and to prevent its rotation thereon in a direction to free the ends of springs 13, slits 33 are formed in the edge of the thimble opposite the slots 29 and when the parts are assembled, the edge of the thimble is crimped in as shown at 34. The slits 33 are so positioned that the crimping process forms shoulders 35 adapted to engage the ends 24 of the springs on the opposite sides thereof from the arms 31, and thereby lock the thimble against rotation. It will be seen that the thimble thus provides unitary means for preventing withdrawal of the spring members from the hub in either a radial or axial direction.

The springs 14 are anchored in a similar manner in axial slots 36 in the anchoring collar 16 and are retained therein by a thimble 37 formed similarly to the thimble 26 and cooperating with said springs in the manner above set forth.

Figure 2:
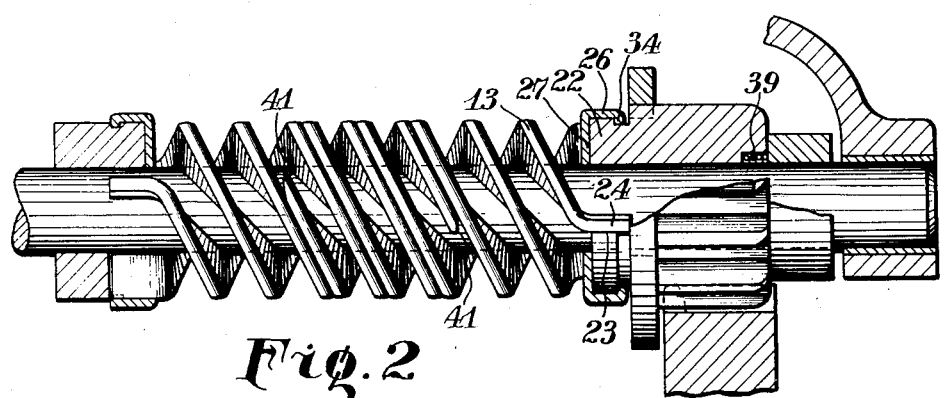
Fig. 2 is a side elevation of the same partly in section showing the elements in driving position.
Figure 3:
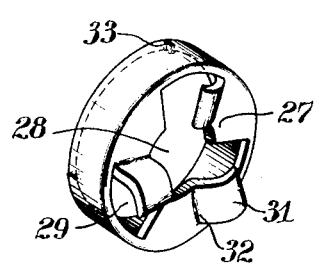
Fig. 3 is a detail in perspective of a locking thimble formed in accordance with the present invention prior to the assembly thereof.
Figure 4:
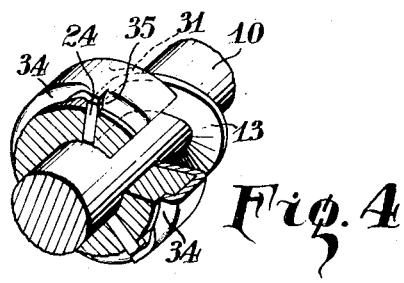
Fig. 4 is a detail in perspective, partly in section, showing the thimble in assembled position.

Means are preferably provided for retaining the pinion in its idle position as illustrated in Fig. 1, such means being here shown in the form of an anti-drift spring 38 mounted on the shaft 10 between the collar 19 and the pinion, and preferably housed in an opening 39 in said pinion when the parts are in driving position as illustrated in Fig. 2.

In certain installations, it is sometimes desirable to augment the inertia of the pinion assembly in order to assist the automatic traversal thereof, and means for this purpose are illustrated in the form of a counter weight 40 which is preferably provided with internal lugs adapted to fit between the teeth of the pinion 11 and which may be forced on said pinion from the front or meshing end of the pinion, and which is suitably retained thereon as by means of riveting or swedging operations.

In assembling the parts of this device, the thimble 26 is first placed on the hub 22 of the pinion with the slots 29 in registry with the slots 23 in said hub. The ends 24 of springs 13 are then inserted through said registering slots, the thimble 26 is rotated until the shoulders 32 abut against the ends of said springs, and the arms 31 bear against the bent portions thereof. The edge of the thimble is then bent inwardly as at 34 to lock the thimble on the hub with the ends 24 of the springs confined between shoulders 32 and 35.

The springs 14 are similarly assembled on the anchoring member 16 by means of the thimble 37. The two spring assemblies are then threaded together, slipped upon the shaft 10, and the anchoring collar 16 fixed thereon by means of key 17 and set screw 18.

The anti-drift spring 36 is then placed on the shaft, and stop collar 19 fixed to the shaft by means of the set screw 21 thus completing the assembly of the device.

In operation, starting with the parts in the positions as shown in Fig. 1, acceleration of the shaft 10 in the direction of the arrow will cause the pinion, by reason of the rotational inertia of the pinion assembly, to be pushed by the action of springs 13 and 14 into engagement with the stop collar 19 as illustrated in Fig. 2. Further rotation of the shaft 10 will be transmitted to the pinion through said springs, causing cranking of the engine in the usual manner. Acceleration of the pinion 11 when the engine starts will cause the spring members 13 to thread themselves back into the springs 14 and draw the pinion to idle position.

It will be noted that during this withdrawal action the springs 13 bear against the rear faces of the springs 14 as shown in Fig. 1 so that the ends of the springs will not strike against the ends of the retaining arms on the thimbles 26 and 37. The free ends of the springs may however be beveled as indicated at 41 if so desired in order to obviate any difficulty of this kind.

Although but one embodiment of the invention has been shown and described in detail, it will be understood that various other embodiments are possible and certain changes might be made in the precise construction shown without departing from the spirit of the invention as defined in the claims appended hereto.

What is claimed is:

1. In an automatic starter shift, a rotatable member having an axially arranged slot therein, a spiral power transmitting spring having an end bent axially to seat in said slot, and a unitary retaining member cooperating with said rotatable member and spring and having means closing said slot to prevent radial movement of said spring from the slot, and having means to engage the spiral portion of the spring to prevent longitudinal movement of the spring from the slot.

2. In an automatic starter shift, a driving member having a slot therein, a spiral spring for actuating said member having an out-turned end adapted to seat in said slot, and a retaining member adapted to enclose the end of said spring in the slot and provided with an arm adapted to bear against said spring and prevent withdrawal thereof.

3. In an automatic starter shift, a rotary driving member having an axial slot therein, a spiral spring for actuating said member having an out-turned end adapted to seat in said slot, and a retaining member adapted to surround the end of said spring in the slot and provided with an extended portion adapted to bear against the bent portion of said spring and prevent withdrawal thereof, said retaining member having means adapted to engage the end of said spring to maintain said extended portion in operative engagement with said spring.

4. In an automatic starter shift, a rotary member having an axial slot therein, a spiral power transmitting spring having an out-turned end adapted to seat in said slot, and a retaining thimble adapted to surround the rotary member and close said slot and and having an arm adapted to bear against the bent portion of the spring to prevent withdrawal of the spring from said slot, said thimble having a shoulder adapted to engage the end of said spring to prevent rotation of said thimble in a direction to relieve the locking action of said arm.

5. In an automatic starter shift, a shaft, a pinion freely mounted thereon and having an extended hub portion provided with a longitudinal slot, means for actuating said pinion including a spiral spring having an end bent approximately axially to engage in said slot, and means for retaining said spring in said slot including a thimble mounted on said hub portion having flanges adapted to lock said thimble thereon and having an arm cooperating with said spring to prevent withdrawal thereof.

6. In an automatic starter shift, a shaft, a pinion freely mounted thereon and having an extended hub portion provided with a longitudinal slot, means for actuating said pinion including a spiral spring having an end bent approximately axially to engage in said slot, and a thimble adapted to surround said hub portion and prevent removal of said spring, said thimble having flanges adapted to lock said thimble on said hub, said flanges having shoulders adapted to engage the end of said spring and prevent rotation of the thimble on said hub.

7. In an automatic starter shift, a shaft, a pinion freely mounted thereon and having an extended hub portion provided with a longitudinal slot, means for actuating said pinion including a spiral spring having an end bent approximately axially to engage in said slot, and a thimble mounted on said hub portion having flanges adapted to lock said thimble thereon, one flange having a slot defined by a shoulder adapted to engage said spring, and an arm extending from said shoulder adapted to bear on the bent portion of the spring and prevent withdrawal thereof and the other flange having a shoulder adapted to engage the opposite side of said spring and prevent rotation of said thimble in a direction to release said spring.

YOUSTON SEKELLA.